United States Patent
Murakami et al.

(10) Patent No.: US 6,221,555 B1
(45) Date of Patent: Apr. 24, 2001

(54) PHOTO-SENSITIVE FIBER

(75) Inventors: Yuichi Murakami, Sagamihara; Yuichi Morishita, Yokohama; Kenichi Muta, Kawasaki, all of (JP); Jen-Hung Chu, Chung-Li; Hen-Tai Shang, Hsinshu, both of (TW)

(73) Assignees: Showa Electric Wire & Cable Co., Ltd.; Prime Optical Fiber Corporation, both of (JP)

( * ) Notice: Subject to any disclaimer, the term of this patent is extended or adjusted under 35 U.S.C. 154(b) by 0 days.

(21) Appl. No.: 09/166,853

(22) Filed: Oct. 6, 1998

(30) Foreign Application Priority Data

Jan. 28, 1998 (JP) .................................................. 10-016020

(51) Int. Cl.[7] .............................. G02B 6/02; G02B 6/34
(52) U.S. Cl. ...................... 430/270.1; 430/321; 430/496; 385/37; 385/127; 385/142; 385/144; 385/33
(58) Field of Search ............................... 385/37, 127, 142, 385/144, 33; 430/321, 496, 270.1

(56) References Cited

U.S. PATENT DOCUMENTS

| | | | |
|---|---|---|---|
| 5,170,457 | * 12/1992 | Jen | 385/123 |
| 5,180,410 | * 1/1993 | Berkey | 65/3.11 |
| 5,432,877 | * 7/1995 | Sun et al. | 385/33 |
| 5,790,726 | * 8/1998 | Ito et al. | 385/37 |
| 5,883,990 | * 3/1999 | Sasaoka et al. | 385/37 |
| 5,896,484 | * 4/1999 | Borrelli et al. | 385/132 |
| 6,005,999 | * 12/1999 | Singh et al. | 385/37 |

* cited by examiner

Primary Examiner—Cynthia Hamilton
Assistant Examiner—Sin J. Lee
(74) Attorney, Agent, or Firm—Lorusso & Loud

(57) ABSTRACT

Abnormal losses outside a reflection band attributable to a mismatch of core field diameters are suppressed. A photo-sensitive fiber comprising a core 1 and a cladding having a cladding inner layer and a cladding outer layer formed in this order around the core, in which at least the core is photo-sensitive to form a grating. The core and cladding inner layer include a photo-sensitive dopant for increasing the refractive index. The core additionally includes a first non-photo-sensitive dopant for increasing the refractive index and the cladding inner layer additionally includes a second non-photo-sensitive dopant for creasing the refractive index.

8 Claims, 3 Drawing Sheets

PHOTO-SENSITIVE FIBER

BACKGROUND OF THE INVENTION

1. Field of the Invention

The present invention relates to a photo-sensitive fiber and, more particularly, to a photosensitive fiber in which abnormal transmission losses can be avoided.

2. Description of the Related Art

Optical fiber gratings utilizing photo-sensitive fibers have been known. Such photo-sensitive fibers normally employ a single mode fiber which can be connected to an optical fiber with less insertion loss (see Japanese unexamined patent publication No. H8-290931, "Optical fiber design for strong gratings photo imprinting with radiation mode suppression" Delevaque E., Boj S., etal, 1994, Optical Fiber Conference 1995, PD5-2, "Thermally enhanced ultraviolet photosensitive in $GeO_2$ and $P_2O_5$ doped optical fiber", P. J. Lemaire, A. W. Vengsarker, W. A. Reed and D. J. DiGiovanni, Appl. Phys. Lett., 66(16), Apr. 17, 1995).

A single mode fiber comprises a cladding formed of silicon dioxide ($SiO_2$) and a core which is formed by adding germanium dioxide ($GeO_2$) to silicon dioxide to provide a high refractive index. Fluorine may be added to the cladding, and fluorine and diphosphorus pentaoxide ($P_2O_5$) may be added to the core.

VAD and MCVD are well known methods for manufacturing such single mode fibers.

A fiber grating is an optical fiber type filter which utilizes a phenomenon that the refractive index of germanium dioxide included in silicon dioxide of an optical fiber is increased when irradiated with ultraviolet light because of defects in the germanium dioxide and in which regions having the increased refractive index are arranged in the core along the optical axis to form a diffraction grating to reflect only beams having a wavelength corresponding to the intervals therebetween.

A photo-sensitive fiber is fabricated by irradiating an optical fiber with ultraviolet light under interference provided using holographic interferometry or masking.

Since the increase in the refractive index of germanium dioxide as a result of irradiation with ultraviolet light is attributable to glass defects therein, when an optical fiber is irradiated with ultraviolet light, a diffraction grating is formed only in the core which includes germanium dioxide. As a result, a region which is irradiated by ultraviolet light and a region which is not irradiated by ultraviolet light have different mode field diameters because the difference between the refractive indices of the core and cladding is different between those regions. Such a mode field mismatch results in mode coupling between light that leaks into and propagates through the cladding and reflected light, causing abnormal transmission losses outside the reflection band.

A known method for suppressing such abnormal transmission losses is to add germanium dioxide also to the cladding such that identical diffraction gratings are formed in both of the core and cladding as a result of irradiation with ultraviolet light. In this case, the amount of germanium dioxide added to the cladding must be the same as that added to the core in order that the gratings formed in the core and cladding are identical.

However, since the cladding must have a refractive index lower than that of the core, a dopant must be added to cancel any increase in the refractive index due to germanium dioxide. Fluorine (F) and boron (B) are known as dopants for decreasing the refractive index.

However, although boron is effective in decreasing the refractive index, its refractive index is increased when irradiated with ultraviolet light as in the case of germanium (Ge). Therefore, the refractive index of the cladding is increased beyond that of the core and hence boron can not be used.

Although fluorine may be added, it is difficult to control the amount to add because its mechanism has not been clarified yet. Known materials used as such an additive include silicon tetrafluoride ($SiF_4$), sulfur hexafluoride ($SF_6$) and dicarbon hexafluoride ($C_2F_6$). With any of these materials, it is difficult to add fluorine in a sufficient amount to cancel the increase of the refractive index attributable to Ge in the same amount as in the core using conventional methods of manufacture.

While the use of $SiF_4$ allows a relatively large amount of fluorine to be added, it necessitates modification of the manufacturing apparatus because it is not used in the manufacture of a normal fiber matrix.

While $C_2F_6$ is used for dry etching of a starting quartz tube during the manufacture of a fiber matrix using MCVD, it can not be added in an amount to cancel the refractive index of a normal single mode core.

According to the above-described methods for manufacturing a photo-sensitive fiber, Ge must be added to the cladding in the same amount as for the core. In a normal single mode, the core includes approximately 7 mol % Ge. When the same amount of Ge is added to the cladding, it is necessary to add another material which has an effect of decreasing the refractive index by an amount corresponding to the increase in the index attributable to Ge. Further, it must be a material having a refractive index which is not affected by ultraviolet illumination in order that the refractive indices of the core and cladding increase by the same amount after irradiation with ultraviolet light. Materials that satisfy those requirements include fluorine (F).

Phosphorus (P) which is effective in increasing a refractive index is added to the core to form regions having a high refractive index in the core with the amount of Ge added therein decreased compared to the prior art. Thus, it is possible to decrease the amount of Ge required to be added to a cladding inner layer.

A decrease in the amount of Ge added to the cladding results in a decrease in the amount of F required to be added, which allows easy fabrication using a conventional process without any special process.

Fluorine can be added to the cladding using dicarbon hexafluoride which is used for dry etching of a starting quartz tube during the manufacture of a fiber matrix using MCVD. In this case, fabrication can be carried out using conventional manufacturing facility.

Since $GeO_2$ is added to a core and a cladding in the same amount, the refractive indices of the core and cladding also increase by the same amount when they are irradiated with ultraviolet light. As a result, in a photo-sensitive fiber, the difference between the refractive indices of the core and cladding remains unchanged in regions irradiated by ultraviolet light and non-irradiated regions. This prevents any mismatch of mode field diameters and hence any abnormal loss outside the reflection band.

It is known that the refractive index of phosphorus (P) is also increased when irradiated with ultraviolet light for a long time, although only slightly. Therefore, when ultraviolet illumination must be provided for a long time during the fabrication of a photo-sensitive fiber, the amount of Ge added to the core may be adjusted such that the refractive indices of the core and cladding increase by the same amount after being irradiated by ultraviolet light.

The present invention has been conceived taking such a situation into consideration, and it is an object of the invention to provide a photo-sensitive fiber in which an optical fiber grating capable of avoiding abnormal transmission losses is provided.

SUMMARY OF THE INVENTION

In order to achieve the above-described object, according to the present invention, there is provided a photo-sensitive fiber comprising a core and a cladding having a cladding inner layer and a cladding outer layer formed in this order around the core, in which at least the core is photo-sensitive fiber to form a grating, characterized in that:

the core and cladding inner layer include a photo-sensitive dopant for increasing the refractive index;

the core includes a first non-photo-sensitive dopant for increasing the refractive index; and the cladding inner layer includes a second non-photo-sensitive dopant for decreasing the refractive index.

According to another aspect of the invention, the photo-sensitive fiber is characterized in that a content of photo-sensitive dopant for increasing the refractive index included in the core and a content of photo-sensitive dopant for increasing the refractive index included in the cladding inner layer are substantially equal.

According to another aspect of the invention, the photo-sensitive fiber is characterized in that when the first non-photo-sensitive dopant for increasing the refractive index is heated and transferred into the photo-sensitive state, the contents of the photo-sensitive dopant for increasing the refractive index included in the core and the photo-sensitive dopant for increasing the refractive index included in the cladding inner layer are, depending on their increments increased by the photo-sensitivity, decreased to substantially equal contents.

According to still another aspect of the invention, the photo-sensitive fiber is characterized in that the content of the second non-photo-sensitive dopant for decreasing the refractive index included in the cladding inner layer is set so that the refractive index of the cladding inner layer and the refractive index of the cladding outer layer are substantially equal.

According to a further aspect of the invention, the photo-sensitive fiber is characterized in that the photo-sensitive dopant for increasing the refractive index is germanium (Ge); the first non-photo-sensitive dopant for increasing the refractive index is phosphorus (P); and the second non-photo-sensitive dopant for decreasing the refractive index is fluorine (F).

In a photo-sensitive fiber having such a configuration, the difference between the refractive indices of the core and cladding inner layer can be kept constant when they are irradiated by ultraviolet light because Ge is added to the cladding inner layer in the same amount as for the core, which makes it possible to prevent abnormal losses outside the reflection band resulting from a mismatch of mode field diameters.

The amount of Ge added to the core is reduced by adding P thereto, which makes it possible to reduce the content of Ge which must be included in the cladding inner layer.

Since the reduction in the content of Ge included in the cladding allows the content of F required for canceling the refractive index of the cladding to be reduced, the photo-sensitive optical fiber can be easily manufactured using a conventional method.

DETAILED DESCRIPTION OF PREFERRED EMBODIMENT

A preferred embodiment of a photo-sensitive fiber according to the invention will now be described with reference to the accompanying drawings.

Figure 1:
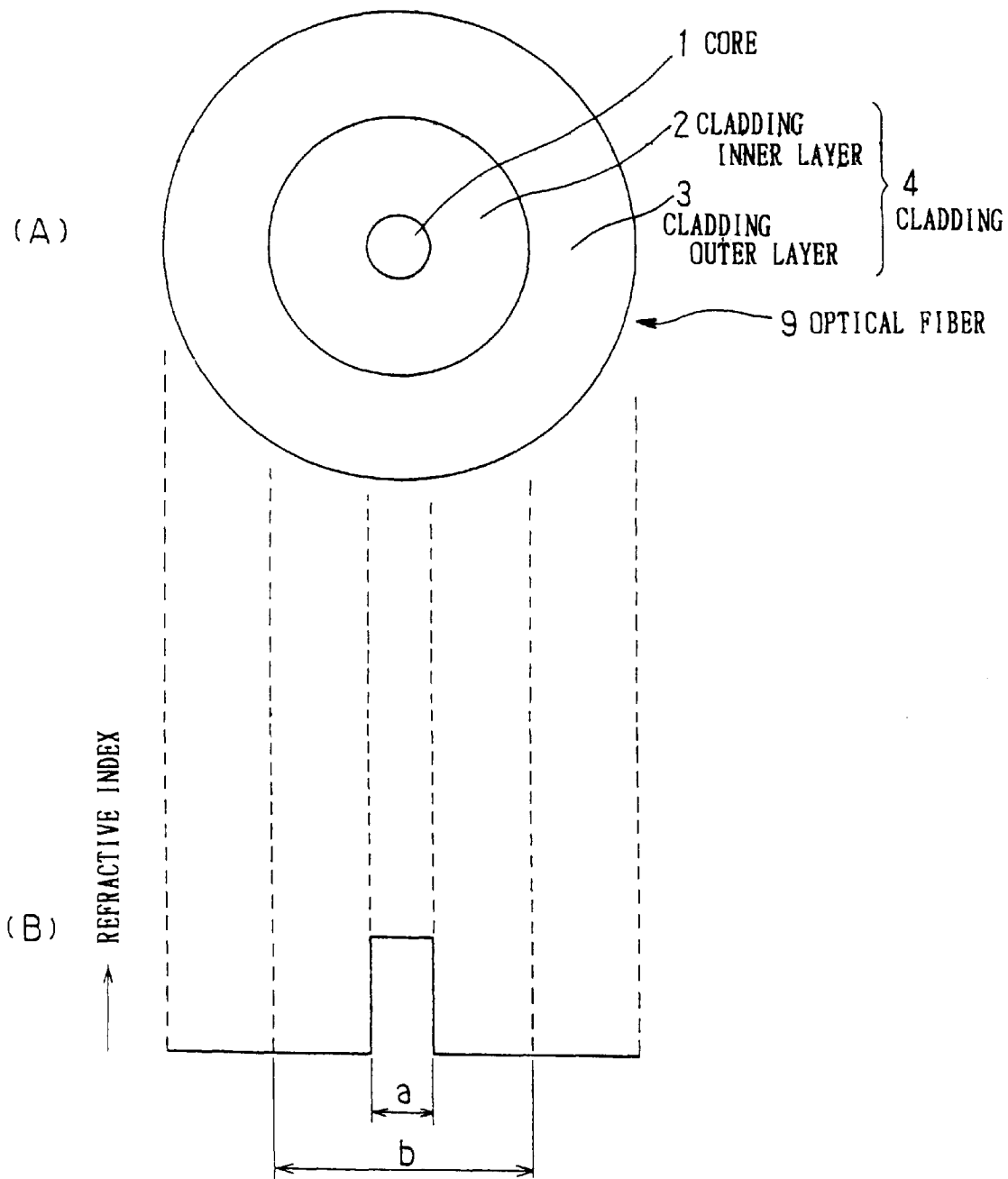
FIG. 1A shows a section of an optical fiber used in a photo-sensitive fiber according to the present invention.
FIG. 1B shows the distribution of the refractive index of the same optical fiber.

In an optical fiber grating utilizing a photo-sensitive fiber according to the invention shown in FIGS. 1A and 1B, a core 1 of an optical fiber 9 is formed by doping $SiO_2$ with a photo-sensitive dopant $GeO_2$ for increasing the refractive index and a first non-photo-sensitive dopant $P_2O_5$ for increasing the refractive index. The content of $GeO_2$ is about one-half of that in a normal single mode fiber, and the content of $P_2O_5$ is set such that the core has the same refractive index as that of a normal single mode fiber.

A cladding inner layer 2 of a cladding 4 of the optical fiber 9 is formed by doping $SiO_2$ with the photo-sensitive dopant $GeO_2$ for increasing the refractive index and a second non-photo-sensitive dopant F for decreasing the refractive index. An outer diameter b of the cladding inner layer 2 must be at least twice an outer diameter "a" of the core 1. The content of $GeO_2$ is equal to the content of Ge in the core 1, and the content of F is an amount that allows the increase in the refractive index due to $GeO_2$ to be canceled.

A cladding outer layer 3 of the cladding 4 is formed of only $SiO_2$. The cladding outer layer 3 is composed using a vapor phase process in the case of VAD and is a part corresponding to a starting quartz tube in the case of MCVD. It may be formed by a layer composed using OVD.

The ratio between the core diameter and the outer diameter is the same as that of a normal single mode fiber.

The optical fiber 9 as an embodiment of the invention was fabricated using MCVD wherein $GeO_2$ concentration and $P_2O_5$ concentration in the core 1 is 0.16% and 0.17%, respectively; $GeO_2$ concentration and F concentration in the cladding inner layer 2 is 0.16% and 0.17%, respectively; and the ratio between the core diameter and the cladding inner layer diameter is 1:2. The cladding outer layer 3 is a natural quartz tube.

Fluorine was added using dicarbon hexafluoride. This material is used for conventional dry etching and, therefore, no modification of facility is made.

Figure 2:
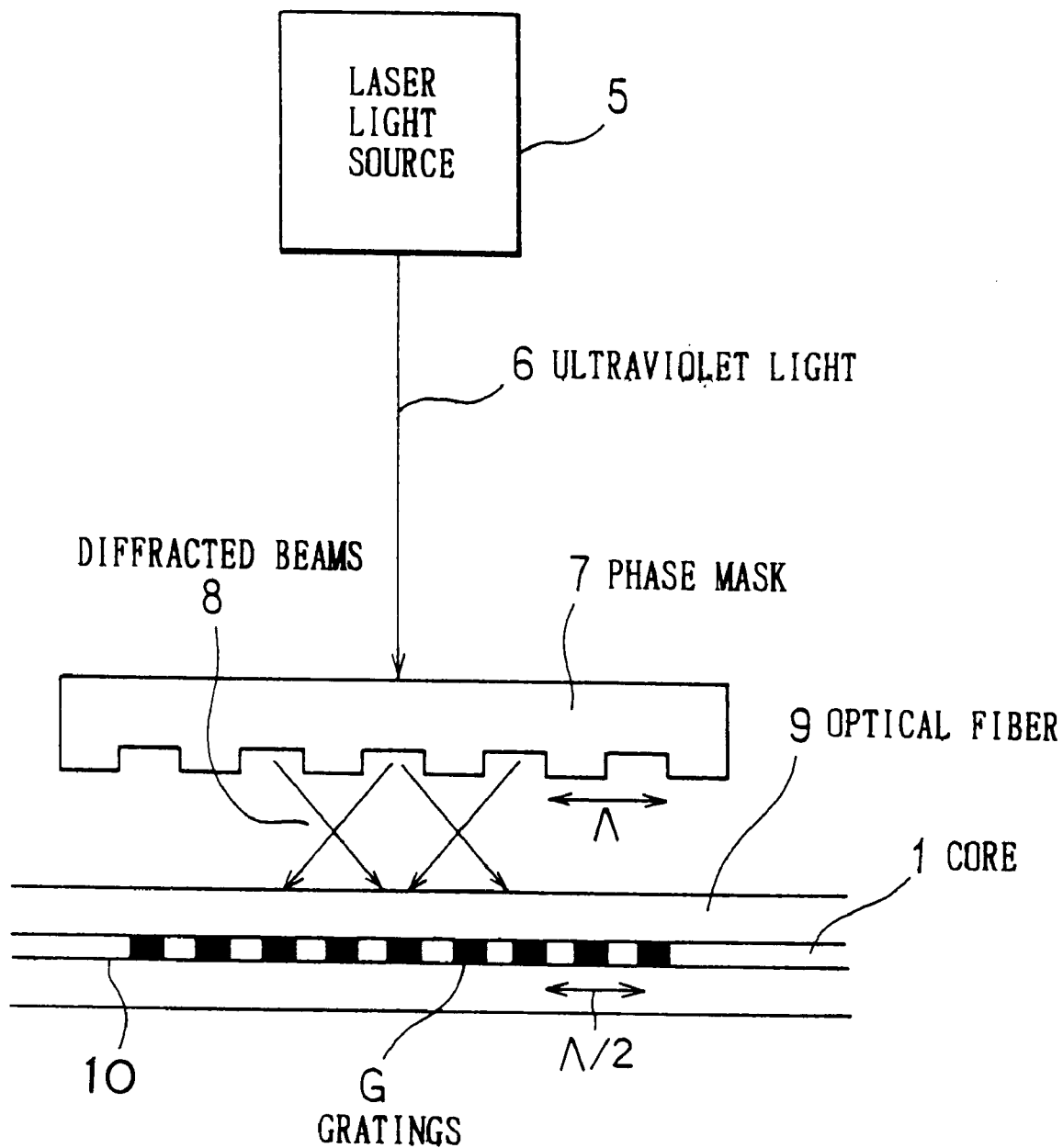
FIG. 2 illustrates a method for manufacturing a photo-sensitive fiber according to the present invention.

FIG. 2 illustrates a method for fabricating the photo-sensitive fiber of the present embodiment. The present embodiment employs a masking process. Ultraviolet light 6 emitted by a laser light source 5 is diffracted by a phase mask 7 provided immediately before the optical fiber, and diffracted beams 8 interfere with each other on the core 1 of the optical fiber 9. A photo-sensitive reaction of the optical fiber 9 to the resulting interference fringes forms a gratings G having intervals of $\Lambda/2$ that depend on a diffraction grating 10. The reflection waveform of the grating G is determined by intervals G of the diffraction grating of the phase mask 7.

In this embodiment, a KrF excimer laser was used as the laser light source, and the mask used here was set such that it had a reflection length of 1551 nm. There was fabricated a grating that achieved reflectivity of 99% or more when irradiated for about two to three minutes.

Figure 3:
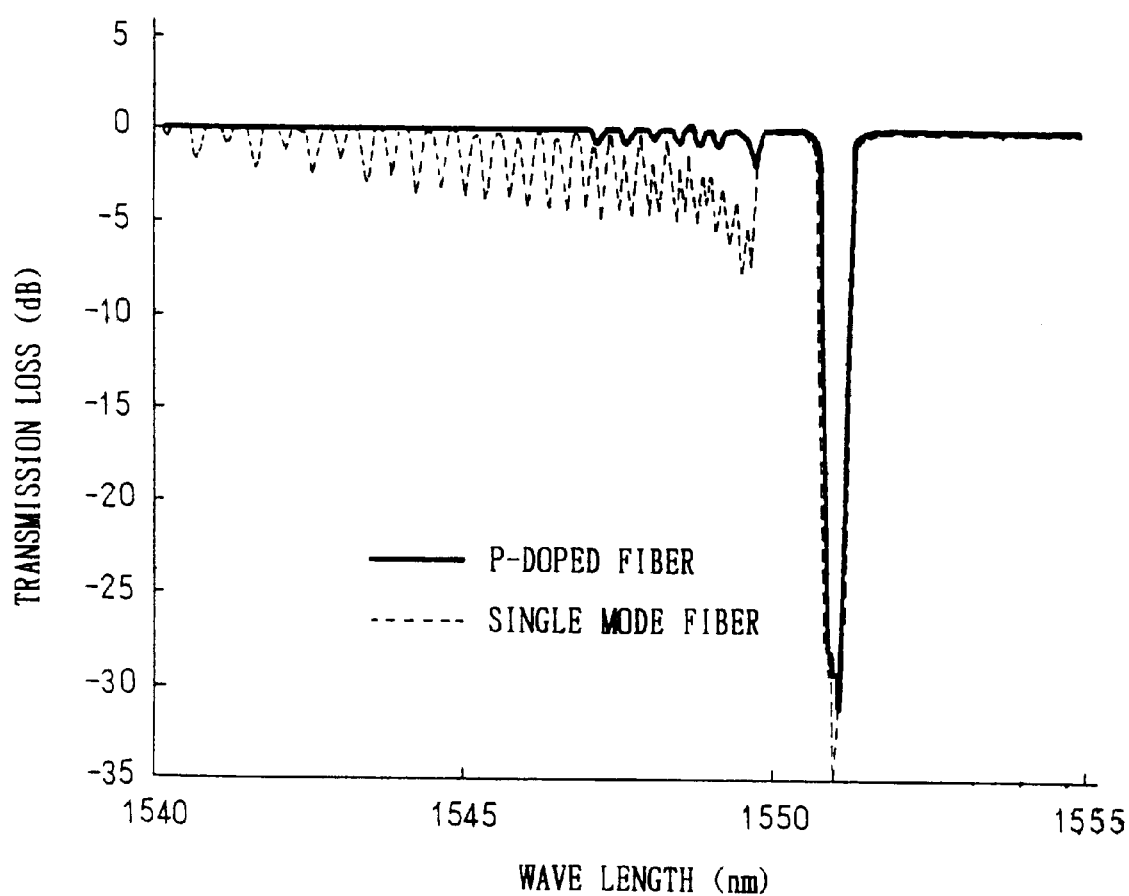
FIG. 3 illustrates a transmission spectrum of a photo-sensitive fiber according to the present invention.

FIG. 3 shows the transmission spectrum of the photo-sensitive fiber fabricated according to the present embodiment. In a photo-sensitive fiber fabricated using a conventional single mode fiber, abnormal losses on the order of 8 dB at the maximum appear outside the reflection band as indicated by the dotted lines when a grating having reflectivity of 99% or more was fabricated. In the present embodiment, such abnormal losses could be suppressed to 2 dB at the maximum as indicated by the solid lines.

While the fiber grating of this embodiment was fabricated using a phase masking process, it may be fabricated using a holographic process.

Further, the matrix for the optical fiber may be fabricated using VAD instead of MCVD as long as the same structure is provided.

In the present embodiment, when the first non-photo-sensitive dopant P for increasing the refractive index is heat-transferred to the photo-sensitive dopant, the contents of the photo-sensitive dopant for increasing the refractive index included in the core 1 and the photo-sensitive dopant for increasing the refractive index included in the cladding inner layer 2 may be decreased, depending on their increments increased by the photo-sensitivity, to substantially equal contents.

By adding Ge to the cladding in the same amount as that in the core, the difference between the refractive indices of the core and cladding can be kept constant even under ultraviolet illumination to suppress abnormal losses outside the reflection band attributable to a mismatch of mode field diameters. By adding P to the core, it is possible to decrease the content of Ge in the core and to decrease the required content of Ge in the cladding. The decrease of the amount of Ge in the cladding makes it possible to decrease the content of F required for cancellation of the refractive index of the cladding. There is an advantage in that the photo-sensitive fiber can be fabricated using a conventional method and in that no modification of manufacturing apparatuses is required because a conventional method can be used for fabrication.

As apparent from the above description, in an optical fiber grating utilizing a photo-sensitive fiber according to the invention, by adding Ge to the cladding in the same amount as that in the core, the difference between the refractive indices of the core and cladding can be kept constant even under ultraviolet illumination to suppress abnormal losses outside the reflection band attributable to a mismatch of mode field diameters.

In a photo-sensitive fiber according to the invention, by adding P to the core, it is possible to decrease the content of Ge in the core and to decrease the required content of Ge in the cladding.

A photo-sensitive fiber according to the invention can be easily fabricated using a conventional method because the decrease of the amount of Ge in the cladding makes it possible to decrease the content of F required for cancellation of the refractive index of the cladding.

There is no need for modifying an apparatus to fabricate a photo-sensitive fiber according to the invention because it can be fabricated using a conventional method.

What is claimed is:

1. A photo-sensitive optical fiber grating, comprising:

a core which is photo-sensitive and which provides a grating by ultraviolet radiation, said core containing (1) a photo-sensitive dopant which increases the refractive index of the core and (2) a first non-photo-sensitive dopant which increases the refractive index of the core and which is partially converted to a photo-sensitive state to further increase the refractive index of the core due to a heated condition responsive to the ultraviolet irradiation;

an inner cladding covering said core and containing (1) a photo-sensitive dopant which increases the refractive index of the inner cladding, and (2) a second non-photo-sensitive dopant which decreases the refractive index of the inner cladding; and an outer cladding covering said inner cladding and formed of only $SiO_2$.

2. A photo-sensitive fiber grating according to claim 1 wherein the content of the second non-photo-sensitive dopant for decreasing the refractive index included in said cladding inner layer is set so that the refractive index of said cladding inner layer and the refractive index of said cladding outer layer are substantially equal.

3. A photo-sensitive fiber grating according to claim 1 wherein said photo-sensitive dopant for increasing the refractive index is germanium (Ge), said first non-photo-sensitive dopant for increasing the refractive index is phosphorus (P), and said second non-photo-sensitive dopant for decreasing the refractive index is fluorine (F).

4. A optical photo-sensitive fiber grating according to claim 1 wherein said second non-photo-sensitive dopant is present in said cladding in an amount providing a decrease in refractive index of said inner cladding equal to the increase in refractive index of said inner cladding provided by said photo-sensitive dopant.

5. A optical photo-sensitive fiber grating according to claim 1 wherein the amount of said photosensitive dopant and said first non-photo-sensitive dopant in said core is present in an amount providing said core with a refractive index equal to that of a normal single mode fiber.

6. A optical photo-sensitive fiber grating according to claim 1 wherein said inner cladding has an outer diameter at least twice an outer diameter of said core.

7. A optical photo-sensitive fiber grating according to claim 1 which has a reflectivity of at least 99%.

8. A optical photo-sensitive fiber grating according to claim 1 wherein abnormal losses are no more than 2 dB.

* * * * *